US011909103B2

(12) United States Patent
Huang et al.

(10) Patent No.: US 11,909,103 B2
(45) Date of Patent: Feb. 20, 2024

(54) BASE STATION ANTENNAS HAVING STAGGERED LINEAR ARRAYS WITH IMPROVED PHASE CENTER ALIGNMENT BETWEEN ADJACENT ARRAYS

(71) Applicant: CommScope Technologies LLC, Hickory, NC (US)

(72) Inventors: Bo Huang, Suzhou (CN); Yunzhe Li, Suzhou (CN)

(73) Assignee: CommScope Technologies LLC, Claremont, NC (US)

( * ) Notice: Subject to any disclaimer, the term of this patent is extended or adjusted under 35 U.S.C. 154(b) by 0 days.

(21) Appl. No.: 18/123,392

(22) Filed: Mar. 20, 2023

(65) Prior Publication Data

US 2023/0231299 A1 Jul. 20, 2023

Related U.S. Application Data

(63) Continuation of application No. 17/153,958, filed on Jan. 21, 2021, now Pat. No. 11,641,055.

(30) Foreign Application Priority Data

Sep. 1, 2020 (CN) ......................... 202010901489.5

(51) Int. Cl.
*H01Q 1/24* (2006.01)
*H01Q 5/48* (2015.01)
*H01Q 3/36* (2006.01)

(52) U.S. Cl.
CPC ............... *H01Q 1/246* (2013.01); *H01Q 5/48* (2015.01); *H01Q 3/36* (2013.01)

(58) Field of Classification Search
CPC ...... H01Q 1/246; H01Q 21/0006; H01Q 3/36; H01Q 5/48
See application file for complete search history.

(56) References Cited

U.S. PATENT DOCUMENTS 5,589,843 A 12/1996 Meredith et al.
2004/0038714 A1 2/2004 Rhodes et al.
(Continued)

FOREIGN PATENT DOCUMENTS

CN 107834198 A 3/2018
CN 209766628 U 12/2019
(Continued)

OTHER PUBLICATIONS

Lee C, A full frequency intelligent Antenna, Nov. 2018, pp. 1-6 (Year: 2018).*
(Continued)

*Primary Examiner* — Keith Ferguson
(74) *Attorney, Agent, or Firm* — Myers Bigel, P.A.

(57) ABSTRACT

A base station antenna includes first and second arrays that include respective pluralities of first and second radiating elements arranged along the longitudinal direction of the base station antenna, the second array transversely adjacent the first array. A longitudinal position of each second radiating element is staggered from that of the corresponding first radiating element. The first array comprises first and second sub-arrays, each of which comprises one or a plurality of adjacent first radiating elements. A phase center of the combination of the first and second subarrays is basically aligned with a sub-phase center of the second array.

20 Claims, 7 Drawing Sheets

(56) References Cited

U.S. PATENT DOCUMENTS

| | | | |
|---|---|---|---|
| 2004/0178964 A1 | 9/2004 | Gottl et al. | |
| 2005/0046514 A1 | 3/2005 | Janoschka | |
| 2008/0309568 A1 | 12/2008 | Deng et al. | |
| 2009/0015498 A1 | 1/2009 | Deng et al. | |
| 2011/0175782 A1 | 7/2011 | Choi et al. | |
| 2012/0007789 A1 | 1/2012 | Petersson et al. | |
| 2017/0222306 A1 | 8/2017 | Biscontini et al. | |
| 2017/0365921 A1 | 12/2017 | Webb et al. | |
| 2018/0034518 A1 | 2/2018 | Schulz et al. | |
| 2018/0309210 A1 | 10/2018 | Sudo | |
| 2019/0268052 A1 | 8/2019 | Ho et al. | |
| 2019/0273315 A1 | 9/2019 | Hu et al. | |
| 2020/0028261 A1 | 1/2020 | Foo | |
| 2020/0067197 A1* | 2/2020 | Tang | H01Q 5/42 |

FOREIGN PATENT DOCUMENTS

| | | |
|---|---|---|
| EP | 2541676 A2 | 1/2013 |
| EP | 3116060 A1 | 1/2017 |
| KR | 20110015423 A | 2/2011 |
| KR | 1020160018916 A | 8/2014 |
| KR | 20160018916 A | 2/2016 |

OTHER PUBLICATIONS

"C. Wei, Z.-Y. Zhang and K.-L. Wu, "Phase Compensation for Decoupling of Large-Scale Staggered Dual-Polarized Dipole Array Antennas," in IEEE Transactions on Antennas and Propagation, vol. 68, No. 4, pp. 2822-2831, Apr. 2020, doi: 10.1109/TAP.2019. 295516".

"European Search Report corresponding to European Application No. 21157629.3, dated Jul. 23, 2021, 9 pages".

"Notification of Transmittal of the International Search Report and the Written Opinion of the International Searching Authority, or the Declaration for corresponding International Application No. PCT/US2021/047631, dated Dec. 23, 2021".

* cited by examiner

BASE STATION ANTENNAS HAVING STAGGERED LINEAR ARRAYS WITH IMPROVED PHASE CENTER ALIGNMENT BETWEEN ADJACENT ARRAYS

CROSS-REFERENCE TO RELATED APPLICATIONS

The present application is a continuation under 35 U.S.C. § 120 of U.S. patent application Ser. No. 17/153,958, filed Jan. 21, 2021, which in turn claims priority to Chinese Patent Application No. 202010901489.5, filed Sep. 1, 2020, the entire content of each of which is incorporated herein by reference as if set forth fully herein.

FIELD

The present invention relates to a communication system, and more particularly, to a base station antenna for a cellular communication system.

BACKGROUND

Base station antennas used in wireless communication systems are used to transmit radio frequency ("RF") signals to and receive RF signals from fixed and mobile users of cellular communication services. Base station antennas generally comprise a linear array or a two-dimensional array of radiating elements, such as crossed dipoles or patch radiating elements. In order to increase the system capacity, beamforming base station antennas are being deployed at present, which comprise a plurality of closely spaced linear arrays of radiating elements (simply referred to as "arrays" or "columns" herein). A typical goal of an antenna with such beamforming capabilities is to generate a narrow antenna beam in the azimuth plane. The RF signals emitted by the radiating elements of the different columns combine to create this antenna beam. This increases the signal power transmitted in the desired user direction and reduces interference.

If the arrays of radiating elements in the beamforming antenna are closely spaced, the antenna beam can be scanned to a very wide angle in the azimuth plane (e.g., 60°) without generating large magnitude sidelobes. However, as the arrays are spaced more closely together, the mutual coupling between the radiating elements in adjacent arrays increases, which reduces other performance parameters of the base station antenna, such as co-polarization performance. In order to maintain close spacing between adjacent arrays of beamforming antennas and increase isolation between radiating elements in adjacent arrays, it may be necessary to stagger adjacent arrays in the longitudinal direction of the base station antenna, which increases the physical spacing between "adjacent" radiating elements in "adjacent" arrays. This staggered structure reduces the mutual coupling between adjacent elements, thus increasing the isolation.

As shown in FIG. 1, a base station antenna comprises radiating elements 1 operating in a lower frequency band and radiating elements 2 operating in a higher frequency band. The radiating elements 1 are respectively arranged in arrays (also called columns) 11 and 12 along the longitudinal direction of the base station antenna, and the radiating elements 2 are respectively arranged in arrays (also called columns) 21 to 24 along the longitudinal direction of the base station antenna. The arrays 11 and 12 are not staggered in the longitudinal direction. For example, as shown by the dotted line A, the physical centers of the two radiating elements in the two arrays are basically transversely aligned. When feeding arrays 11 and 12, the radiating elements 1 in the arrays 11 and 12 can be divided into a plurality of sub-arrays (also called "subsets"). In this specification, each sub-array comprises one or a plurality of adjacent (i.e., continuously positioned) radiating elements. The sub-arrays may include one or a plurality of radiating elements and are represented in the figures by a solid square frame that surrounds the radiating element(s). Each of the arrays 11 and 12 is fed by a phase shifter, and each sub-array is coupled to a corresponding output of the phase shifter (see the description of FIG. 2 for details). Generally, a sub-array comprises two or three radiating elements that are mounted on a feed board and coupled to an output of the phase shifter. It should be understood that one sub-array may comprise other numbers of radiating elements. In the example shown in FIG. 1, because the arrays 11 and 12 are not staggered in the longitudinal direction, the phase centers of the corresponding sub-arrays are basically aligned. For example, as shown by dashed lines F and I, the phase center D of sub-array 111 of array 11 is basically aligned with the phase center E of sub-array 121 of array 12, and the phase center G of sub-array 112 is basically aligned with the phase center H of sub-array 122.

When the phase centers of a first element X and a second element Y are basically aligned, the phase of electromagnetic radiation of element X is basically consistent with that of element Y at any point on the elevation plane (i.e., at any elevation angle). The elements X and Y may each be a single radiating element, a combination of radiating elements, a sub-array, a combination of sub-arrays, an array, etc.

Two adjacent arrays in the arrays 21 to 24 are staggered in the longitudinal direction. For example, the longitudinal position of each radiating element 2 in array 21 is staggered with respect to that of the corresponding radiating element 2 in array 22, as shown by the dotted lines B and C in FIG. 1, and the amount of stagger s is equal to half of the longitudinal distance d between two adjacent radiating elements in the same array, that is, s=0.5 d. If the arrays 21 to 24 adopt a feeding mode similar to that of the arrays 11 and 12, as shown in FIG. 2, the phase centers of adjacent arrays will also shift accordingly. Each of the arrays 21 to 24 is fed by a phase shifter (for each polarization), and each sub-array is coupled to a corresponding output of the phase shifter. For simplicity, only the feeding configuration of the array 24 is shown in FIG. 2, and the feeding configurations of the arrays 21 to 23 are similar. The phase shifter 3 feeds the array 24. The array 24 comprises sub-arrays 241 to 245, each of which comprises two or three radiating elements. Each of the sub-arrays 241 to 245 is coupled to a corresponding output (31 to 35) of the phase shifter 3. Each of the arrays 21, 22, 23 are likewise coupled to a respective phase shifter (not shown), with each sub-array of the respective arrays coupled to a corresponding output of the respective phase shifter. The phase center of a sub-array (e.g., sub-array 241) that contains three radiating elements is approximately at the center of the middle radiating element, and the phase center of a sub-array containing 2 radiating elements is approximately halfway between the two radiating elements. If the arrays 21 to 24 are fed as shown in FIG. 2, the phase centers of the two corresponding sub-arrays in two adjacent arrays will be misaligned. For example, the phase center of each of the sub-arrays 211 to 214 in array 21 is longitudinally staggered from the phase center of the corresponding sub-array in array 22, and the stagger amount (also called staggered distance) is s. Since the number of radiating elements in array 22 or 24 is one less than that in array 21 or 23, the phase centers of the sub-arrays located at the lowest end of each array are aligned with each other, for example, the sub-array 215 and the corresponding sub-array in the array 22.

The above-mentioned feeding configuration of arrays 21 to 24 not only results in a stagger of the phase centers of corresponding sub-arrays between adjacent arrays, but also staggers the phase centers of adjacent arrays. For example, the phase center of array 21 is offset upward from the phase center of array 22. This phase center offset between adjacent arrays causes spatial phase difference between arrays, which will distort the radiation pattern of antenna beams formed by these arrays.

In addition, it is also desirable to electrically adjust the elevation angle of the antenna beams generated by the beamforming antenna so as to adjust the coverage area of the antenna in the elevation plane. This can be done separately for each array using the electromechanical phase shifters. However, the disadvantage is that, with the increase of the applied electrical tilt angle, the distortion to the antenna beam caused by the offset of the phase centers of adjacent arrays may increase. To compensate for this distortion, different amplitudes and/or phase weights can be adopted for different radiating element arrays. However, including this compensation system will increase the design difficulty and/or cost of the antenna system.

SUMMARY

According to the first aspect of the present invention, a base station antenna is provided, comprising: a first array that includes a plurality of first radiating elements arranged along the longitudinal direction of the base station antenna; and a second array that includes a plurality of second radiating elements arranged along the longitudinal direction of the base station antenna, the second array transversely adjacent the first array, wherein the longitudinal position of each second radiating element is staggered from that of the corresponding first radiating element, wherein, the first array comprises first and second sub-arrays, each of which comprises one or a plurality of adjacent first radiating elements, and wherein a phase center of the combination of the first and second subarrays is basically aligned with a sub-phase center of the second array.

According to a second aspect of the present invention, a base station antenna is provided, comprising: a first column of radiating elements, wherein the first column has a first sub-phase center; and a second column of radiating elements transversely adjacent to the first column, the longitudinal positions of the first column and the second column being staggered by a first staggered amount, wherein the second column has a second sub-phase center, the longitudinal positions of the first sub-phase center and the second sub-phase center are basically aligned, the first column comprises first and second subsets of radiating elements, and a phase center of the combination of the first and second subsets basically coincides with the first sub-phase center.

According to a third aspect of the present invention, a base station antenna is provided, comprising: a first column of radiating elements, wherein the first column comprises a first phase center; and a second column of radiating elements adjacent to the first column, wherein the second column comprises a second phase center, the first and second columns are staggered in the longitudinal direction of the base station antenna, the first and second phase centers are basically aligned, the first column comprises first and second subsets, and any one of the first and second subsets comprises one or a plurality of adjacent radiating elements, and the phase center of the combination of the first and second subsets basically coincides with the first phase center.

According to a fourth aspect of the present invention, a base station antenna is provided, comprising: a first array that includes a plurality of first radiating elements arranged along a longitudinal direction of the base station antenna; a second array that includes a plurality of second radiating elements arranged along the longitudinal direction of the base station antenna, the second array transversely adjacent the first array, wherein the longitudinal positions of the second radiating elements are staggered from the longitudinal positions of the first radiating elements, wherein a phase center of a first sub-array of the first array is a first distance above a phase center of the first array, wherein a phase center of a second sub-array of the first array is the first distance below the phase center of the first array, wherein a phase center of a first sub-array of the second array is a second distance above a phase center of the second array, wherein a phase center of a second sub-array of the second array is the second distance below the phase center of the second array, wherein the phase center of the first array and the phase center of the second array are aligned along a transverse direction, and wherein the first distance is different from the second distance.

According to a fifth aspect of the present invention, a base station antenna is provided, comprising: a first array that includes a plurality of first radiating elements arranged along a longitudinal direction of the base station antenna; and a second array that includes a plurality of second radiating elements arranged along the longitudinal direction of the base station antenna and transversely adjacent to the first array, wherein the longitudinal positions of the second radiating elements are staggered from that of the longitudinal positions of the first radiating elements, wherein a phase center of a combination of a first sub-array and a second sub-array of the first array is aligned along a transverse axis with a phase center of a combination of a first sub-array and a second sub-array of the second array.

Other features and advantages of the present invention will be made clear by the following detailed description of exemplary embodiments of the present invention with reference to the accompanying drawings.

BRIEF DESCRIPTION OF THE DRAWING

Note, in the embodiments described below, the same signs may be used in different drawings to denote the same parts or parts with the same functions, and repeated descriptions thereof are omitted. In some cases, similar labels and letters are used to indicate similar items.

Figure 1:
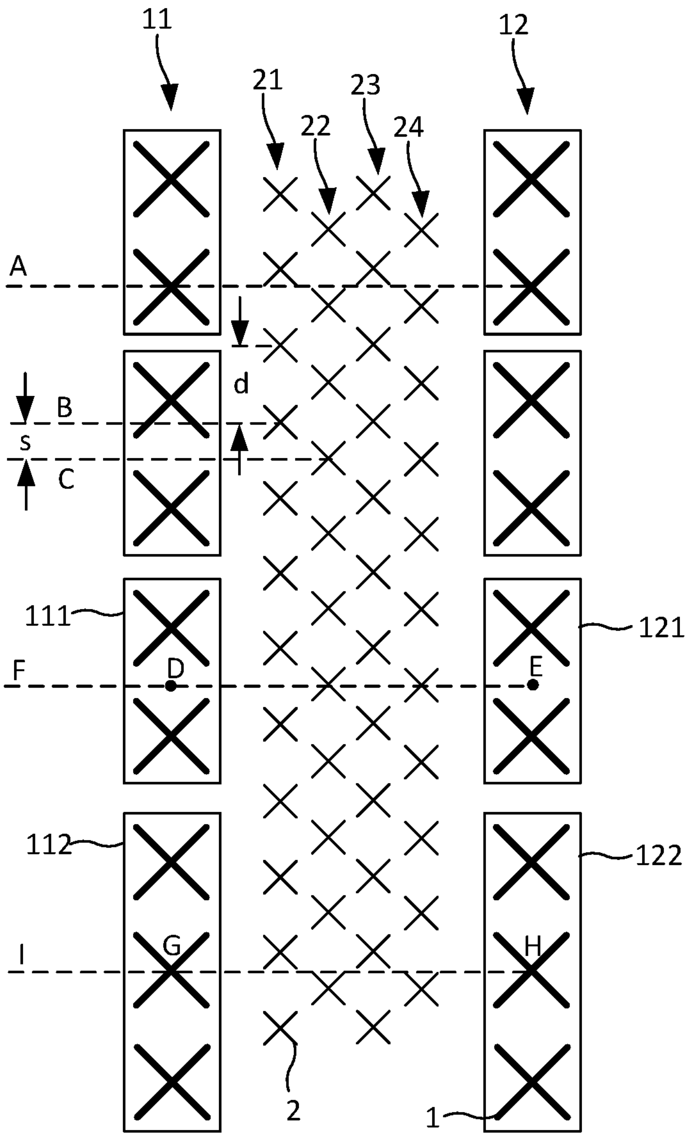
FIG. 1 is a schematic front view of a radiating element array in a conventional base station antenna and a schematic diagram of a feeding configuration of some arrays.

For ease of understanding, the position, size, and range of each structure shown in the drawings and the like may not indicate the actual position, size, and range. Therefore, the present invention is not limited to the position, size, range, etc. disclosed in the drawings.

DETAILED DESCRIPTION

The present invention will be described below with reference to the accompanying drawings, which show several embodiments of the present invention. However, it should be understood that the present invention can be presented in many different ways and is not limited to the embodiments described below. In fact, the embodiments described below are intended to make the present invention more complete and to fully explain the protection scope of the present invention to those skilled in the art. It should also be understood that the embodiments disclosed herein may be combined in various ways so as to provide additional embodiments.

It should be understood that the terms used herein are only used to describe specific embodiments, and are not intended to limit the scope of the present invention. All terms used herein (including technical terms and scientific terms) have meanings normally understood by those skilled in the art unless otherwise defined. Well-known functions or structures may not be described in detail.

As used herein, when an element is said to be "on" another element, "attached" to another element, "connected" to another element, "coupled" to another element, or "in contact with" another element, etc., the element may be directly on another element, attached to another element, connected to another element, coupled to another element, or in contact with another element, or an intermediate element may be present. In contrast, when an element is said to be "on" another element, "attached" to another element, "connected" to another element, "coupled" to another element, or "in contact with" another element, etc., no intermediate element may be present. As used herein, when one feature is arranged "adjacent" to another feature, it may mean that one feature has a part overlapping with the adjacent feature or a part located above or below the adjacent feature.

As used herein, spatial relationship terms such as "upper", "lower", "left", "right", "front", "back", "high" and "low" can explain the relationship between one feature and another in the drawings. It should be understood that, in addition to the orientations shown in the attached drawings, the terms expressing spatial relations also comprise different orientations of a device in use or operation. For example, when a device in the attached drawings is turned upside down, the features originally described as being "below" other features now can be described as being "above" the other features. The device may also be oriented in other directions (rotated by 90 degrees or in other orientations), and in this case, a relative spatial relation will be explained accordingly.

As used herein, the term "A or B" comprises "A and B" and "A or B", not exclusively "A" or "B", unless otherwise specified.

As used herein, the word "basically" means including any minor changes caused by design or manufacturing defects, device or component tolerances, environmental influences, and/or other factors. The word "basically" also allows for deviation from the perfect or ideal situation due to parasitic effects, noise, and other practical considerations that may be present in the actual implementation.

In addition, for reference purposes only, "first", "second" and similar terms may also be used herein, and thus are not intended to be limiting. For example, unless the context clearly indicates, the words "first", "second" and other such numerical words involving structures or elements do not imply a sequence or order.

It should also be understood that when the terms "comprise" and "include" and other forms thereof indicate the presence of the specified feature, entirety, step, operation, unit and/or component, but does not exclude the presence or addition of one or a plurality of other features, steps, operations, units and/or components and/or combinations thereof.

It should be noted that, as used herein, phase centers other than the phase center of an entire array, such as the phase centers of radiating elements, phase centers of sub-arrays and the phase centers of the combination of sub-arrays, are also called "sub-phase centers" of arrays.

Figure 3A:
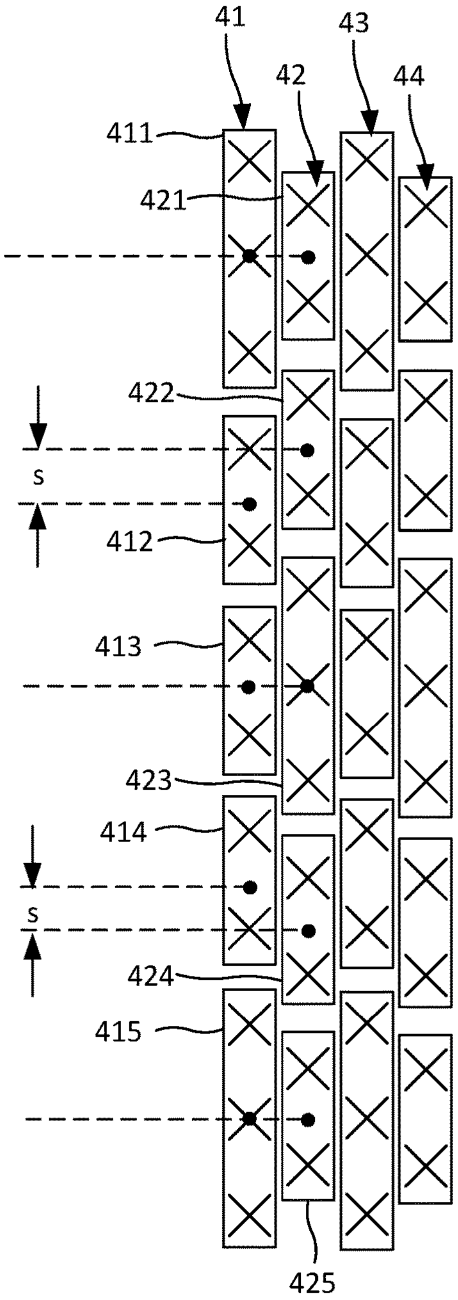
FIG. 3A is a schematic front view of the feeding configurations for some of the arrays in a base station antenna according to an embodiment of the present invention.

FIG. 3A is a schematic diagram of the feeding configuration of some arrays in a base station antenna according to an embodiment of the present invention. The base station antenna comprises a plurality of transversely adjacent arrays 41 to 44, each of which includes a plurality of radiating elements that are arranged along the longitudinal direction of the antenna, and each array is fed by a corresponding phase shifter (not shown). In two adjacent arrays, the longitudinal position of each radiating element in one array is staggered with respect to that of the corresponding radiating element in the other array by a stagger amount s, which is equal to half of the distance d between two adjacent radiating elements in one array.

The radiating elements in each array can be divided into sub-arrays, and each sub-array is coupled to a corresponding output of the phase shifter. In adjacent arrays 41 and 42, the phase centers of sub-array 411 of array 41 and sub-array 421 of array 42, and those of sub-arrays of 413 and 423, and those of sub-arrays of 415 and 425, are basically aligned, while the phase centers of sub-arrays 412 and 422, and those of sub-arrays of 414 and 424 are staggered by a distance s. It can be understood that because the longitudinal positions of the arrays 41 and 42 are staggered, the numbers of radiation elements comprised in the sub-arrays whose phase centers are basically aligned at the corresponding positions of the two arrays are different. For example, the phase-aligned sub-arrays shown in the figure comprise two and three radiating elements, respectively. It should be understood that sub-arrays including other numbers of radiating elements can also be phase-aligned, for example, sub-arrays respectively including one and two radiating elements, sub-arrays respectively including one and four radiating elements, etc.

Figure 3B:
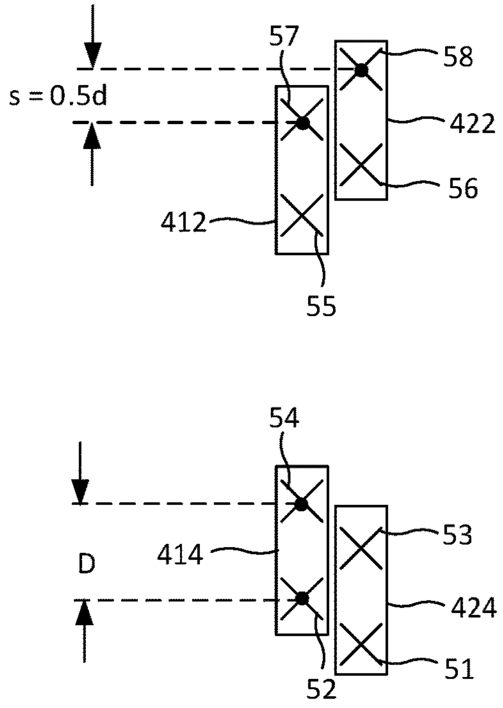
FIG. 3B is a schematic diagram of some of the sub-arrays in FIG. 3A.

If the phase centers of all sub-arrays in one array are aligned with the phase centers of the corresponding sub-arrays in an adjacent array, then the phase centers of the two arrays are aligned. Therefore, those aligned sub-arrays will not make the phase centers of the two arrays staggered. For the convenience of analysis, only the sub-arrays 412, 414, 422, 424 with misaligned phase centers in the arrays 41 and 42 are shown in FIG. 3B, and those sub-arrays that do not offset the phase centers of the arrays 41 and 42 are omitted. When the electronic downtilt angles of the arrays 41 and 42 are $\theta$, the phases $\varphi 1$ to $\varphi 8$ of the radiating elements 51 to 58 (FIG. 3B) at a specific elevation angle of the elevation plane are as follows, respectively, where the radiating element 58 is set as a reference point, that is, the phase of the radiating element 58 is 0.

$$\varphi 1=-\varphi 0+6kd\sin\theta$$

$$\varphi 2=-\varphi 0+5.5kd\sin\theta$$

$$\varphi 3=0+5kd\sin\theta$$

$$\varphi 4=0+4.5kd\sin\theta$$

$$\varphi 5=\varphi 0+1.5kd\sin\theta$$

$$\varphi 6=\varphi 0+kd\sin\theta$$

$$\varphi 7=0+0.5kd\sin\theta$$

$$\varphi 8=0$$

where φ0 is the preset phase difference (for example, caused by the feeding line) between two radiating elements in a sub-array (for example, a group of radiating elements which are coupled to the output of the same phase shifter and fed by the same feeding plate), k is the transmission coefficient of electromagnetic waves in vacuum, and its value is $$\frac{2\pi f}{c}.$$

When the electronic downtilt angle is θ, the phase of the combination of sub-arrays 412 and 414 at the specific elevation angle is −0.5φ0+3kd sin θ. In particular, the phase of sub-array 412 is the average of the phase centers of radiating elements 55 whose phase is j−φ0+1.5kd sin θ and 57 whose phase is 0+0.5kd sin θ, which is −0.5φ0+kd sin θ. Similarly, the phase of sub-array 414 is the average of the phase centers of radiating elements 52 whose phase is −φ0+5.5kd sin θ and 54 whose phase is 0+4.5kd sin θ, which is −0.5φ0+5kd sin θ. The phase of the combination of sub-arrays 412 and 414 at the specific elevation angle of the elevation plane is −0.5φ0+3kd sin θ. The phase of the combination of sub-arrays 422 and 424 at the specific elevation angle of the elevation plane can similarly be calculated as −0.5φ0+3kd sin θ. It can be seen that the phase of the combination of sub-arrays 412 and 414 is consistent with that of the combination of sub-arrays 422 and 424, and this is true for any elevation angle. That is, at any point on the elevation plane, the phase of the combination of sub-arrays 412 and 414 is consistent with that of the combination of sub-arrays 422 and 424. Therefore, the phase center of the combination of sub-arrays 412 and 414 is aligned with the phase center of the combination of sub-arrays 422 and 424. It should be noted that although sub-arrays 412 and 414 of array 41 are coupled to different outputs of the phase shifter, they are all fed by the same phase shifter. The phase shifter has only one input (usually connected with radio devices other than the base station antenna by cable), that is, the time that the signal is fed to the sub-array 412 is the same as the time that the signal is fed to the sub-array 414, so the electromagnetic radiation of the sub-array 412 and that of the sub-array 414 can be superimposed in space, and the concept of the phase or phase center of the combination of the sub-arrays 412 and 414 exists. The same is true for sub-arrays 422 and 424.

In sum, in adjacent arrays 41 and 42, the phase centers of sub-arrays 411 and 421, sub-arrays 413 and 423, and sub-arrays 415 and 425 are basically aligned, and the phase centers of sub-arrays 412 and 414, and sub-arrays 422 and 424 are also basically aligned, so the phase center of array 41 is basically aligned with that of array 42. In the base station antenna according to this embodiment of the present invention, by designing the feeding configuration of two adjacent arrays of radiating elements, the phase centers of two arrays with staggered positions are aligned as much as possible, so that the base station antenna not only has the advantage of staggered array positions, but also can reduce or even eliminate the adverse effects caused by the misalignment of phase centers between arrays.

Thus, the base station antenna of FIG. 3A includes a first array 41 that has a plurality of first radiating elements arranged along a longitudinal direction and a second array 42 that includes a plurality of second radiating elements arranged along the longitudinal direction. The second array 42 is transversely adjacent the first array 41. The longitudinal positions of the second radiating elements are staggered from the longitudinal positions of the first radiating elements. The first array 41 comprises first and second sub-arrays (e.g., sub-arrays 412, 414), each of which comprises one or a plurality of adjacent first radiating elements. Moreover, a sub-phase center of the combination of the first and second subarrays (e.g., sub-arrays 412, 414) is basically aligned with a sub-phase center of the second array (e.g., the phase center of sub-array 423 and/or the phase center of the combination of sub-arrays 422, 424).

The first array 41 may comprise a first column of first radiating elements, and the second array 42 may comprise a second column of second radiating elements that is transversely adjacent the first column. The longitudinal positions of the first column and the second column are staggered by a first staggered amount. The first column has a first sub-phase center (e.g., the phase center of sub-array 413) and the second column has a second sub-phase center (e.g., the phase center of sub-array 423), and the longitudinal positions of the first and second sub-phase centers are basically aligned. The first column comprises first and second subsets of radiating elements (e.g., sub-arrays 412, 414), and a phase center of the combination of the first and second subsets basically coincides with the first sub-phase center.

As can also be seen in FIG. 3A, a phase center of a first sub-array (sub-array 412) of the first array 41 is a first distance above a phase center of the first array 41, and a phase center of a second sub-array (sub-array 414) of the first array 41 is the first distance below the phase center of the first array 41. Likewise, a phase center of a first sub-array (sub-array 422) of the second array 42 is a second distance above a phase center of the second array 42, and a phase center of a second sub-array (sub-array 424) of the second array 42 is the second distance below the phase center of the second array 42. The phase center of the first array 41 and the phase center of the second array 42 are aligned along a transverse direction, and the first distance is different from the second distance.

The difference between the first distance and the second distance is less than the distance "d" between two adjacent first radiating elements in the first array. The difference between the first distance and the second distance may equal to half the distance "d" between two adjacent first radiating elements in the first array. As can also be seen from FIG. 3A, a phase center of the combination of the first and second sub-arrays 412, 414 of the first array 41 may be co-located with the phase center of the first array 41.

It should be noted that each array 41-44 includes radiating elements that are exactly aligned along respective longitudinal axes. It will be appreciated that in other cases, the arrays/columns 41-44 may have some degree of horizontal stagger.

The positions of the two combined sub-arrays in the arrays can be arranged as required. Combined with the above description with reference to FIG. 3B, it can be known that the phase of each radiating element is related to its position in the array (i.e., the distance from the reference point) when the elevation angle and downtilt angle are fixed. Moreover, when the numbers of radiating elements in the mutually combined sub-arrays are the same, the two sub-arrays are symmetrical with respect to the transverse axis passing through the phase center of the combination. Therefore, it is only necessary to symmetrically arrange the two sub-arrays combined with each other on both sides of the transverse axis passing through the phase center of the combination, without limiting the distance from the sub-arrays to the phase center of the combination.

Figure 4A:
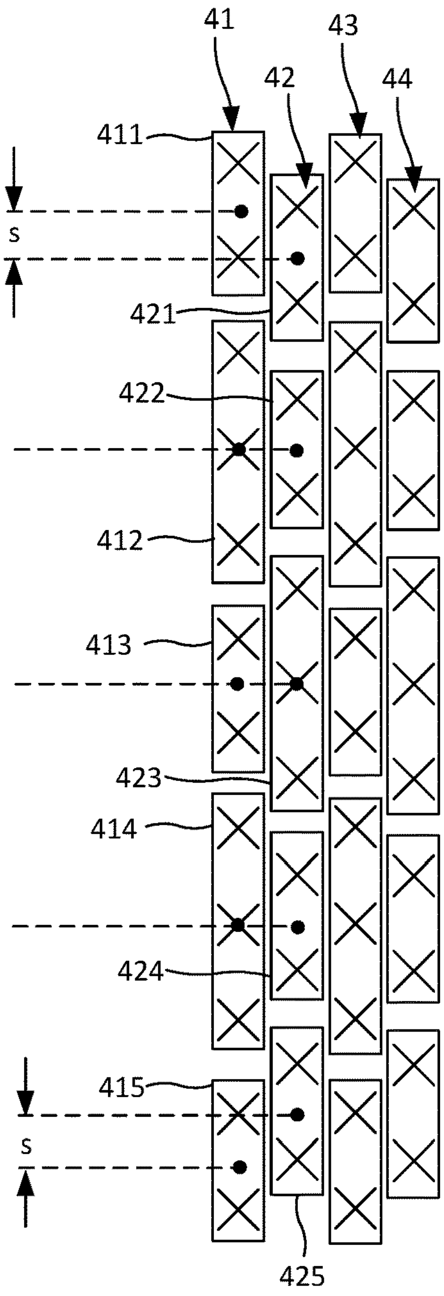
FIGS. 4A to 4C are schematic front views of the feeding configurations for some arrays in base station antennas according to further embodiments of the present invention.

For example, in the embodiment shown in FIG. 4A, the phase center of the combination of the uppermost sub-array 411 and the lowermost sub-array 415 of the array 41 is basically aligned with the phase center of the combination of the uppermost sub-array 421 and the lowermost sub-array 425 of the array 42. Other sub-arrays 412 and 422, sub-arrays 413 and 423, sub-arrays 414 and 424 whose phase centers are aligned with each other are located in the middle of the respective arrays 41 and 42.

Figure 4B:
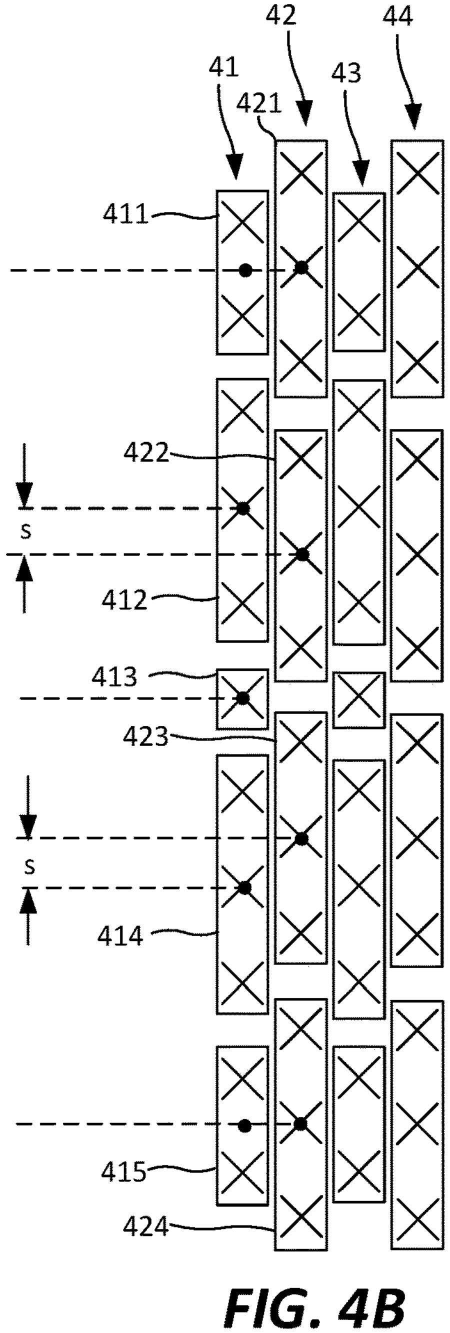

In the above embodiments, the sub-arrays that are combined with each other to have matching phase centers with a combination of sub-arrays in an adjacent array have two radiating elements. It should be understood that other numbers of radiating elements can be included in the sub-arrays that are combined with each other. For example, in the embodiment shown in FIG. 4B, the phase center of the combination of sub-array 412 containing three radiating elements and sub-array 414 containing three radiating elements is basically aligned with that of the combination of sub-array 422 containing three radiating elements and sub-array 423 containing three radiating elements. In addition, the array 41 also comprises a sub-array 413 whose phase center is aligned with the phase center of the array 41. In this case, although there is no sub-array aligned with the sub-array 413 in the array 42, the phase centers of the arrays 41 and 42 are still aligned. It should be noted that in the embodiment shown in FIG. 4B, the numbers of sub-arrays in arrays 41 and 42 are different, with array 41 including five sub-arrays 411 to 415 and array 42 including four sub-arrays 421 to 424. Array 41 can be fed with a phase shifter having 5 outputs, and array 42 can be fed with a phase shifter having 4 outputs, or can be fed with 4 outputs of a phase shifters having 5 outputs. The feeding modes of phase shifters in the following adjacent arrays with different sub-arrays are similar, so they will not be described again.

Figure 2:
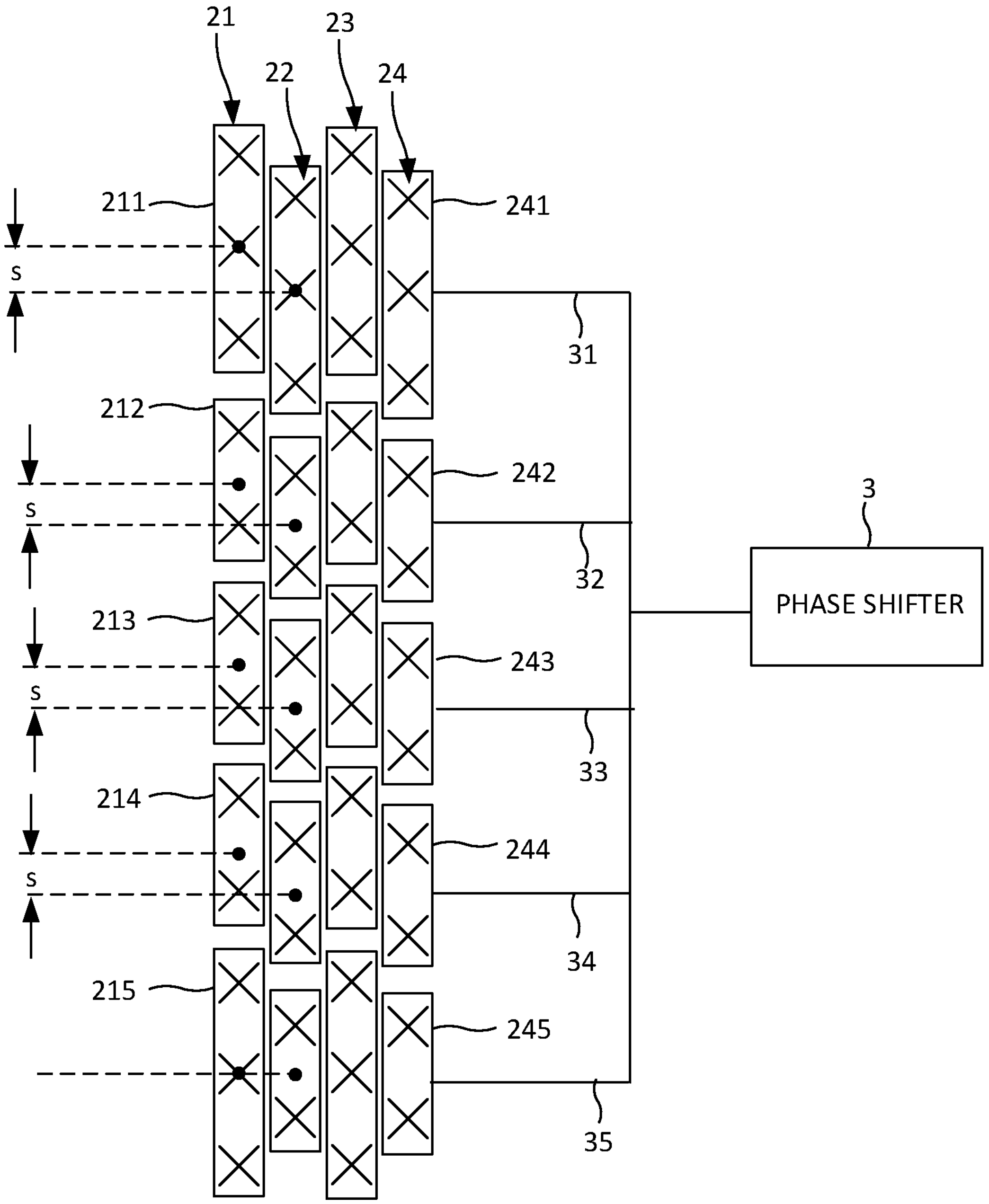
FIG. 2 is a schematic front view showing the feeding configuration of other arrays in FIG. 1.
Figure 4C:
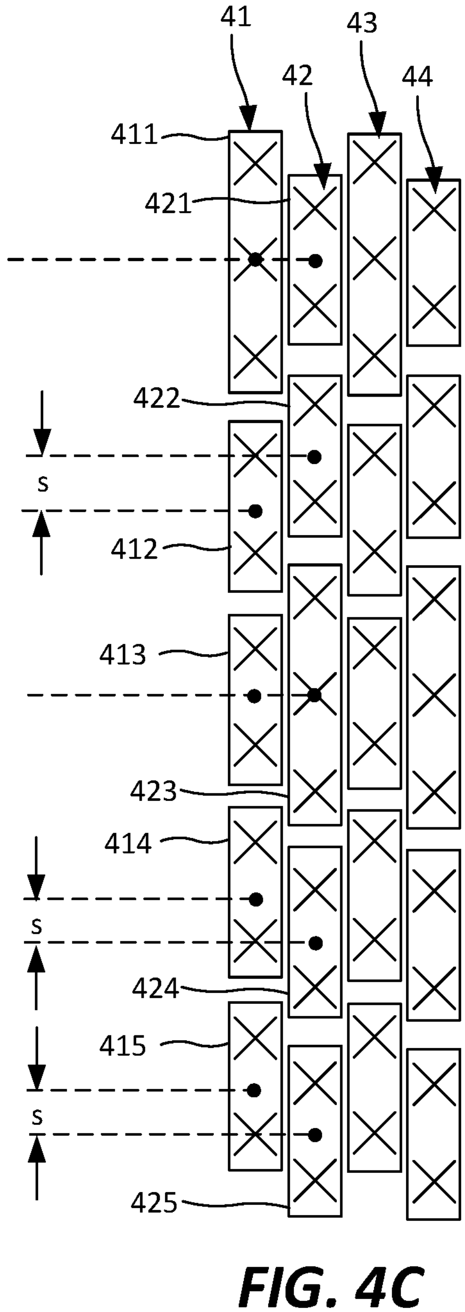

In some cases, the phase centers of the arrays can be slightly staggered. As long as the staggered amount of the phase centers of the arrays is smaller than the staggered amount of the physical centers of the arrays, it can obtain smaller distortion than the arrays with the feeding mode shown in FIG. 2, that is, better RF performance. It can be understood that the smaller the stagger amount of the phase centers between arrays, the smaller the distortion of radiation patterns of these arrays. In the embodiment shown in FIG. 4C, the phase centers of sub-arrays 411 and 421 and sub-arrays 413 and 423 are basically aligned, and the phase centers of the combination of sub-arrays 412 and 414 and the combination of sub-arrays 422 and 424 are basically aligned, while the phase centers of sub-arrays 415 and 425 located at the lowermost ends of the arrays 41 and 42 are staggered by a distance s. Experiments show that there are no phase-aligned sub-arrays in a few radiating element sub-arrays, which will not cause noticeable adverse effects on the RF performance of the base station antenna. Especially, as in this embodiment, the sub-arrays with misaligned phases are arranged at the end of the array, i.e., where the amplitude of the fed RF signal is the smallest, so as to minimize the influence of the phase offset of the sub-arrays on the phase offset of the entire array.

In the above-described embodiment, the feeding configurations of arrays 43 and 44 are the same as those of arrays 41 and 42, respectively, so they will not be described again. In the embodiment described below, only two adjacent arrays 61 and 62 of the base station antenna are shown. It should be understood that the base station antenna can also comprise more arrays with similar feeding configurations or arrays with other known feeding configurations.

Figure 5A:
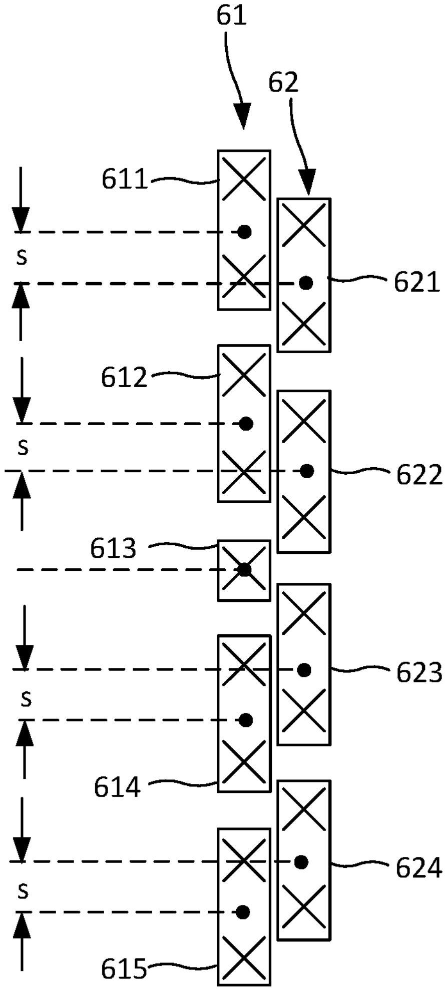
FIGS. 5A to 5E are schematic front views of the feeding configurations for some arrays in base station antennas according to still further embodiments of the present invention.

In some cases, the physical centers of two adjacent arrays are basically aligned. For example, the numbers of radiating elements in two arrays differ by one. In these cases, it is only necessary to adjust the phase center of each array to the physical center of the array by designing the feeding configuration so as to make the phase centers of two adjacent arrays basically aligned. In addition, adjacent arrays may not even comprise sub-arrays with aligned phase centers. In the embodiment shown in FIG. 5A, two adjacent arrays 61 and 62 do not comprise sub-arrays with aligned phase centers, and the phase centers of the corresponding sub-arrays 611 and 621, sub-arrays 612 and 622, sub-arrays 614 and 623, and sub-arrays and 615 and 624 are all staggered by a distance s. In addition, in array 62, there is no sub-array aligned with the phase center of sub-array 613 located in the middle of the array 61. Nevertheless, the phase center of the combination of sub-arrays 611 and 615, the phase centers of the combination of sub-arrays 612 and 614, and the phase center of sub-array 613 may all basically coincide with the physical center of the array 61. The phase center of the combination of sub-arrays 621 and 624 and the phase center of the combination of sub-arrays 622 and 623 may all basically coincide with the physical center of the array 62. The physical centers of the arrays 61 and 62 are basically aligned. Therefore, the phase centers of the arrays 61 and 62 are basically aligned.

Figure 5B:
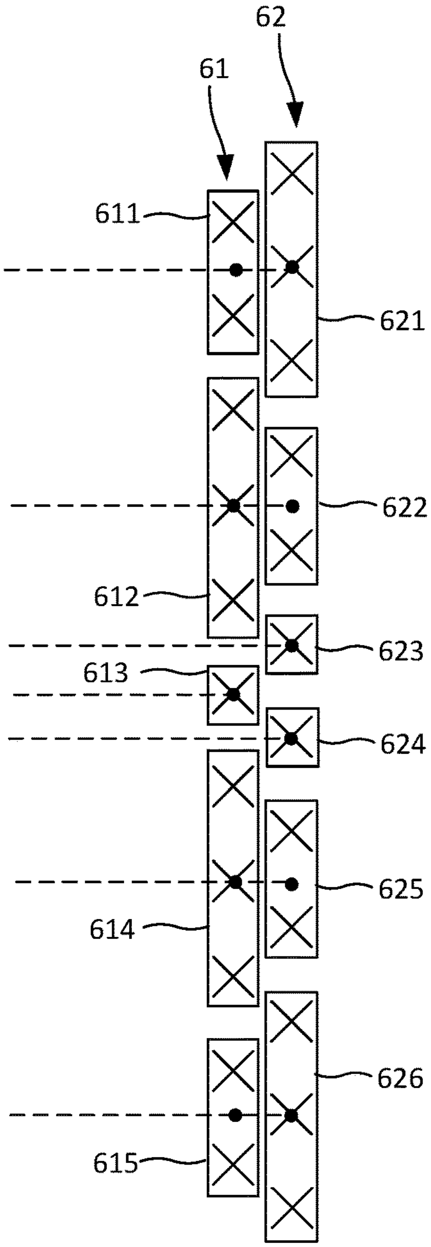
Figure 5C:
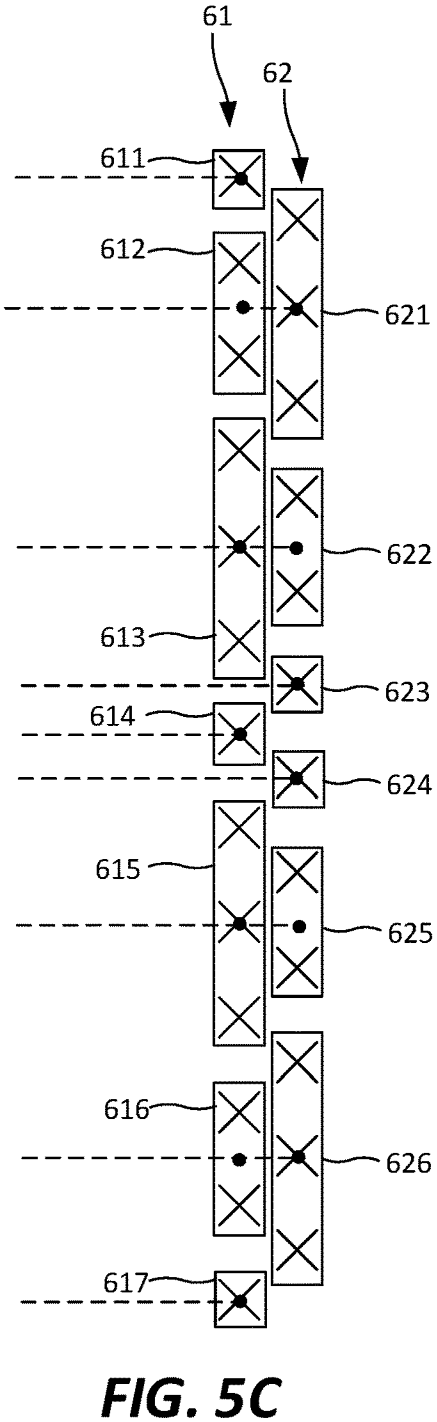

In the above embodiments, the sub-arrays combined with each other all contain more than one radiating element. In the embodiment shown in FIG. 5B, the phase centers of sub-arrays 611 and 621, sub-arrays 612 and 622, sub-arrays 614 and 625, and sub-arrays 615 and 626 are basically aligned, and the phase center of the combination of sub-arrays 623 and 624 is basically aligned with the phase center of sub-array 613. Therefore, the phase centers of the entire arrays 61 and 62 are basically aligned. In the embodiment shown in FIG. 5C, the phase centers of sub-arrays 612 and 621, sub-arrays 613 and 622, sub-arrays 615 and 625, and sub-arrays 616 and 626 are basically aligned. The phase center of the combination of sub-arrays 623 and 624 and the phase center of the combination of sub-arrays 611 and 617 are basically aligned with the phase center of sub-array 614. Therefore, the phase centers of arrays 61 and 62 are basically aligned.

Figure 5D:
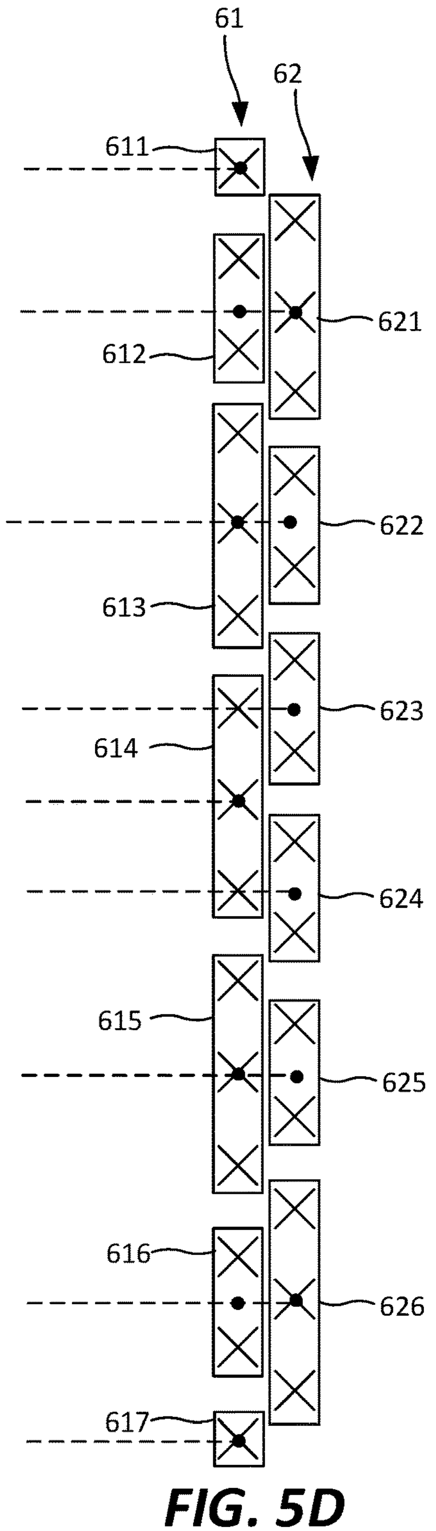
Figure 5E:
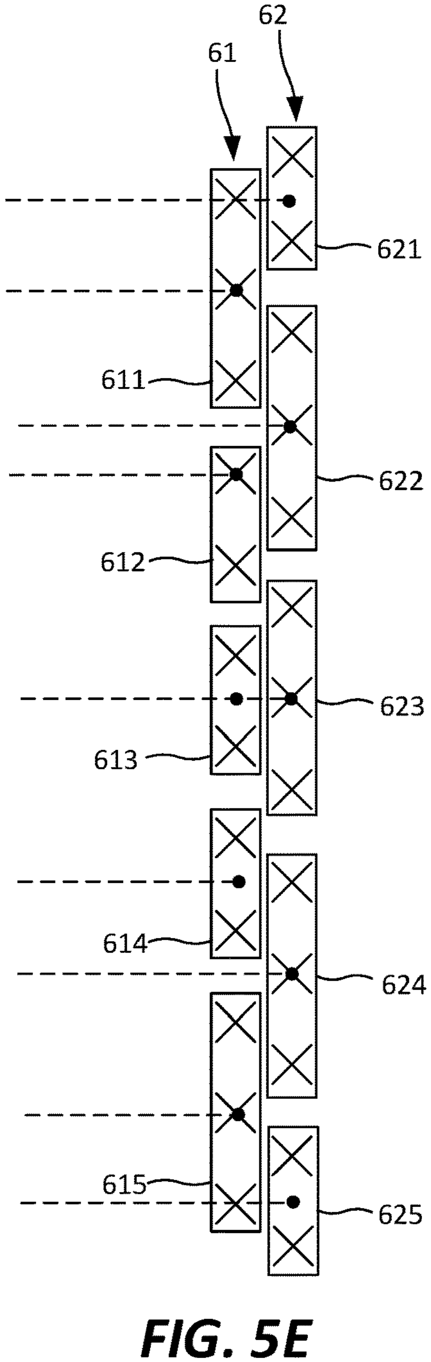

The number of radiating elements contained in the combined sub-arrays of one array may be different from that of radiating elements contained in the combined sub-arrays of another array. In the embodiment shown in FIG. 5D, the phase centers of sub-arrays 612 and 621, sub-arrays 613 and 622, sub-arrays 615 and 625, and sub-arrays 616 and 626 are basically aligned. The phase center of the combination of sub-arrays 623 and 624 and the phase center of the combination of sub-arrays 611 and 617 are basically aligned with the phase center of sub-array 614. Therefore, the phase centers of arrays 61 and 62 are basically aligned. In the embodiment shown in FIG. 5E, the phase centers of the sub-arrays 613 and 623 are basically aligned. The phase center of the combination of sub-arrays 612 and 614 and the phase center of the combination of sub-arrays 611 and 615 are basically aligned with the phase center of sub-array 613. The phase center of the combination of sub-arrays 622 and 624 and the phase center of the combination of sub-arrays 621 and 625 are basically aligned with the phase center of sub-array 623. Therefore, the phase centers of arrays 61 and 62 are basically aligned.

Although some specific embodiments of the present invention have been described in detail by examples, those skilled in the art should understand that the above examples are only for illustration, not for limiting the scope of the present invention. The embodiments disclosed herein can be combined arbitrarily without departing from the spirit and scope of the present invention. Those skilled in the art should also understand that various modifications can be made to the embodiments without departing from the scope and spirit of the present invention. The scope of the present invention is defined by the claims attached.

That which is claimed is:

1. A base station antenna, comprising:

a first array that includes a plurality of sub-arrays of first radiating elements, where each sub-array of first radiating elements is on a respective first feed board, the plurality of sub-arrays of first radiating elements arranged along a longitudinal direction of the base station antenna; and a second array that includes a plurality of sub-arrays of second radiating elements, where each sub-array of second radiating elements is on a respective second feed board, the plurality of sub-arrays of second radiating elements arranged along the longitudinal direction of the base station antenna, wherein a phase center of a first of the sub-arrays of first radiating elements is not aligned with respective phase centers of any of the sub-arrays of second radiating elements, and wherein a phase center of a combination of a first of the sub-arrays of first radiating elements and a second of the sub-arrays of first radiating elements is aligned with a phase center of a combination of a first of the sub-arrays of second radiating elements and a second of the sub-arrays of second radiating elements.

2. The base station antenna according to claim 1, wherein a longitudinal position of each second radiating element is offset from the longitudinal positions of all of the first radiating elements.

3. The base station antenna according to claim 2, further comprising a first phase shifter configured to feed the first array, wherein the first and second of the sub-arrays of first radiating elements are coupled to respective first and second outputs of the first phase shifter.

4. The base station antenna according to claim 1, wherein the number of first radiating elements included in the first sub-array of first radiating elements is equal to the number of first radiating elements included in the second sub-array of first radiating elements.

5. The base station antenna according to claim 1, wherein a phase center of the first array is aligned with a phase center of the combination of the first of the sub-arrays of first radiating elements and the second of the sub-arrays of first radiating elements.

6. The base station antenna according to claim 1, wherein the first and second arrays are configured to jointly generate a same antenna beam.

7. A base station antenna, comprising:

a first longitudinally-extending array that includes a plurality of first feed boards, where each first feed board includes one or more first radiating elements mounted thereon;

a second longitudinally-extending array that includes a plurality of second feed boards, where each second feed board includes one or more second radiating elements mounted thereon, wherein none of the first radiating elements are aligned with any of the second radiating elements in a transverse direction;

wherein a phase center of a combination of the first radiating elements mounted on a first of the first feed boards and the first radiating elements mounted on a second of the first feed boards is aligned with a phase center of a combination of the second radiating elements mounted on a first of the second feed boards and the second radiating elements mounted on a second of the second feed boards.

8. The base station antenna according to claim 7, wherein the number of first radiating elements mounted on the first of the first feed boards is equal to the number of first radiating elements mounted on the second first of the first feed boards.

9. The base station antenna according to claim 7, wherein the first and second longitudinally-extending arrays are configured to jointly generate a same antenna beam.

10. The base station antenna according to claim 7, wherein a phase center of the first longitudinally-extending array is aligned with a phase center of the combination of the first radiating elements mounted on the first of the first feed boards and the first radiating elements mounted on the second of the first feed boards.

11. A base station antenna, comprising:

a first array that includes a plurality of sub-arrays of first radiating elements that are arranged along a longitudinal direction of the base station antenna;

a second array that includes a plurality of sub-arrays of second radiating elements that are arranged along the longitudinal direction of the base station antenna, wherein a phase center of the uppermost of the sub-arrays of first radiating elements is not aligned with a phase center of any of the sub-arrays of second radiating elements, and wherein a phase center of the combination of the uppermost of the sub-arrays of first radiating elements and a lowermost of the sub-arrays of first radiating elements is aligned with a phase center of the combination of an uppermost of the sub-arrays of second radiating elements and a lowermost of the sub-arrays of second radiating elements.

12. The base station antenna according to claim 11, wherein a longitudinal position of each second radiating element is offset from the longitudinal positions of all of the first radiating elements.

13. The base station antenna according to claim 12, wherein a phase center of the first array is aligned with a phase center of the combination of the uppermost of the sub-arrays of first radiating elements and the lowermost of the sub-arrays of first radiating elements.

14. The base station antenna according to claim 13, further comprising a first phase shifter configured to feed the first array, wherein the uppermost and lowermost of the sub-arrays of first radiating elements are coupled to respective first and second outputs of the first phase shifter.

15. The base station antenna according to claim 11, wherein the number of first radiating elements included in the first sub-array of first radiating elements is equal to the number of first radiating elements included in the second sub-array of first radiating elements.

16. The base station antenna according to claim 11, wherein the first and second columns are configured to jointly generate a same antenna beam.

17. A base station antenna, comprising:

a first array that includes a plurality of first radiating elements arranged along a longitudinal direction of the base station antenna;

a second array that includes a plurality of second radiating elements arranged along the longitudinal direction of the base station antenna, the second array transversely adjacent the first array, wherein the longitudinal positions of the second radiating elements are staggered from the longitudinal positions of the first radiating elements, wherein a phase center of a first sub-array of the first array is a first distance above a phase center of the first array, wherein a phase center of a second sub-array of the first array is the first distance below the phase center of the first array, wherein a phase center of a first sub-array of the second array is a second distance above a phase center of the second array, wherein a phase center of a second sub-array of the second array is the second distance below the phase center of the second array, wherein the phase center of the first array and the phase center of the second array are aligned along a transverse direction, and wherein the first distance is different from the second distance.

18. The base station antenna according to claim 17, wherein a difference between the first distance and the second distance is less than a distance between two adjacent first radiating elements in the first array.

19. The base station antenna according to claim 17, wherein a difference between the first distance and the second distance is equal to half a distance between two adjacent first radiating elements in the first array.

20. The base station antenna according to claim 17, wherein a phase center of the combination of the first and second sub-arrays of the first array is co-located with the phase center of the first array.

* * * * *